No. 745,700. PATENTED DEC. 1, 1903.
R. B. WEAVER.
CRANK SHAFT FOR ENGINES.
APPLICATION FILED JULY 8, 1903.
NO MODEL.
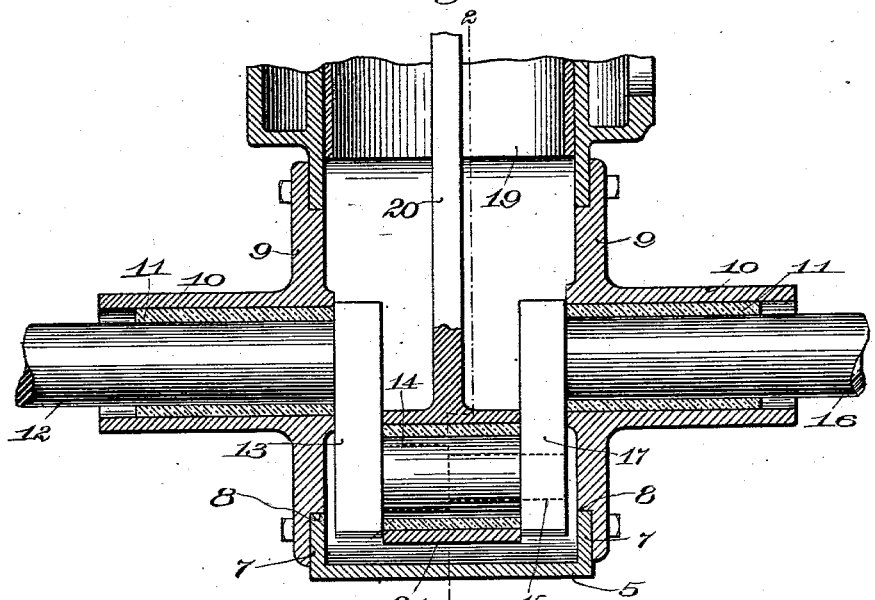
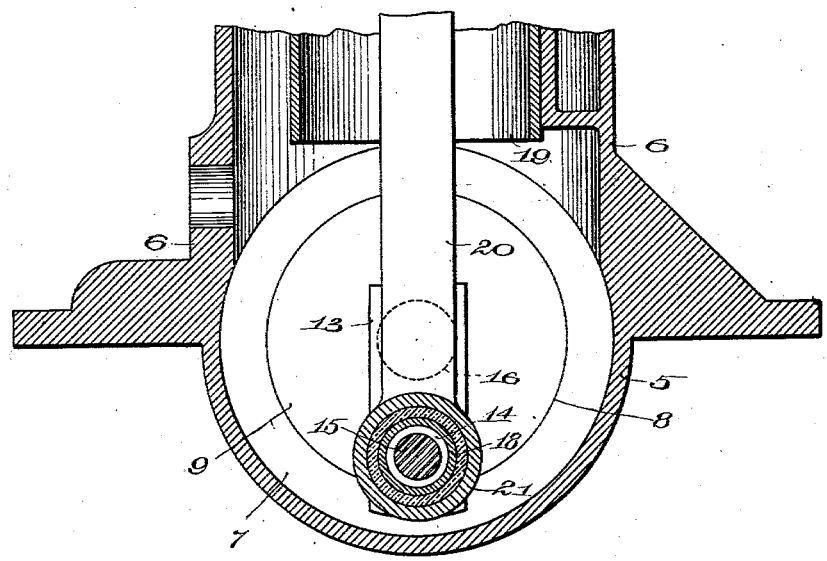
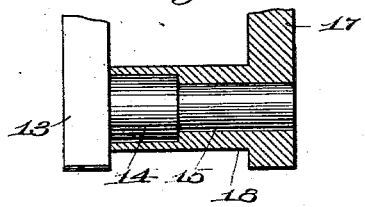
Witnesses:
Inventor:
Ralph B. Weaver No. 745,700. Patented December 1, 1903.

UNITED STATES PATENT OFFICE.

RALPH B. WEAVER, OF MILTON, MASSACHUSETTS, ASSIGNOR TO SAMUEL CABOT, OF BOSTON, MASSACHUSETTS.

CRANK-SHAFT FOR ENGINES.

SPECIFICATION forming part of Letters Patent No. 745,700, dated December 1, 1903.

Application filed July 8, 1903. Serial No. 164,679. (No model.)

*To all whom it may concern:*

Be it known that I, RALPH B. WEAVER, of Milton, in the county of Norfolk and State of Massachusetts, have invented certain new and useful Improvements in Crank-Shafts for Engines, of which the following is a specification, reference being had therein to the accompanying drawings.

This invention has reference to improvements in crank-shafts for engines and in the connection therewith of the piston-rod.

One object of the invention is to facilitate the assembling of the crank-shaft with the bearings in which it is journaled and with the piston-rod.

Another object of the invention is to so construct a crank-shaft that a solid bearing-sleeve for the piston-rod may be utilized.

Another object of the invention is to improve the general construction of crank-shafts and their associated parts.

The invention consists in the peculiar features of construction and combination of parts whereby the objects of the invention are effected, as will hereinafter be more fully described, and pointed out in the claim.

Figure 1 represents a sectional view of portions of an engine, illustrating this invention. Fig. 2 represents a sectional view of the same, taken at right angles to Fig. 1. Fig. 3 represents a detail view of portions of the crank-shaft.

Similar numbers of reference designate corresponding parts throughout.

In engines, and particularly in gas-engines, it is important to reduce the number of parts which are secured together with bolts, owing to the constant attention required to tighten the same in order to prevent the damage occurring from a loosened part and to maintain the parts in accurate operative relation. It is also essential to the assembling of the parts, especially in small engines having contracted crank-boxes, that the crank-shaft should be associated with the piston-rod and the bearings in which the crank-shaft works without the subsequent adjustment of nuts of bolts within the contracted limits of the crank-box, and at the same time facilitate the assembling of these parts.

In the drawings, 5 indicates the crank-box, having the closed sides 6 6 and the ends 7 7 furnished with the openings 8 8. To these ends 7 7 are secured in any suitable manner the closures or plates 9 9, having or provided with the shaft-bearings 10 10, preferably supplied with the sleeves 11 11.

The crank-shaft is divided into two parts, each of which is journaled in its related bearing 10. The part 12 has the crank-arm 13, on which is mounted the pin 14, having the end 15 reduced in diameter from that of the main portion of the pin, the part 16 having the arm 17 furnished with the socket-pin 18, shaped to receive the pin 14 of the shaft member 12 with a close sliding fit.

The piston 19 may be connected with its rod 20 in any suitable manner. This connection is not shown herein, as it forms no part of the present invention, and at one end of the piston-rod is the annular solid strap or bearing 21, designed to closely embrace the socket-pin 18 to permit of the rotation of said pin therein.

The parts may readily be assembled by positioning the strap 21 opposite one of the openings 8 8 and inserting in the strap the socket-pin 18, then inserting the arm 13, with its pin 14, through the other of the openings 8, and seating the pin 14 in the socket of the pin 18, the plates 9 9 being then bolted or otherwise secured to the ends 7 7 of the crank-box.

Owing to the alinement of the bearings 10 10 no fastening for the parts of the crank is necessary, and the spreading of the arms 13 and 17 is prevented by the plates 9 9, while the strength of the connection formed by the pins 14 and 18 between the arms 13 and 17 and the strap 21 is equal to that of a solid pin.

By the use of this two-part crank the strap 21 is preferably continuous without fastening devices or adjustment screws or bolts of any kind. This is an important consideration in gas-engines designed to be mounted on unsubstantial supporting means, such as vehicles and boats, which are subject to such vibration that there is a constant tendency and action to loosen nuts and other fastenings, with the resulting damage to the moving parts of the machine, whether from the throwing of the working parts out of true thereby or by the guiding of the loosened nuts or bolts between the parts of the crank and piston and the walls of the crank-box. This peculiar construction of the two-part crank-pin also permits of a certain degree of flexibility in the action of the crank, which is of some importance in that class of engines used in motor vehicles and launches, the repair of engines of this character being also facilitated by this construction.

Having thus described my invention, I claim as new and desire to secure by Letters Patent—

The combination with the box 5 having the ends 7 7 furnished with the openings 8 8, and the plates 9 9 adapted to close said openings and having the bearings 10 10, of the shaft members 12 and 16 the member 12 having the arm 13 furnished with the pin 14 having the end 15, the shaft member 16 having the arm 17 furnished with the socket-pin 18 adapted to receive the pin 14 and the piston-rod 20 having the continuous strap 21 in which the pin 18 is journaled, as and for the purpose described.

In testimony whereof I affix my signature in presence of two witnesses.

RALPH B. WEAVER.

Witnesses:
HENRY J. MILLER,
C. A. LISET.